Patented Mar. 27, 1928.

1,663,577

UNITED STATES PATENT OFFICE.

JOSEPH RIGBY WATSON, OF BERKELEY, CALIFORNIA.

FIRE-RESISTING COMPOSITION.

No Drawing.    Application filed March 23, 1925.    Serial No. 17,795.

This invention relates to fire resisting compositions, and more particularly to such compositions to be used in spraying and painting roofs and walls of buildings.

One of the objects of this invention is to supply fire resisting compositions which when applied to fibrous substances for example, will prevent those fibrous substances from burning upon contact with fire.

Other and further objects and advantages of this invention will appear from the more detailed description set forth below, it being understood that various changes in composition and proportions may be made by those skilled in the art without departing from the spirit and scope of this invention.

In exemplifying this invention, a fire resisting composition is preferably first applied to the surface to be protected, followed by the application of a paint composition which also possesses fire resisting properties. Several examples of the compositions and method of using them will now be given.

For example, in treating roofs, a solution of alum, salt, and water is first applied. The preferred proportions are:

Alum, 2 pounds; salt, 1 pound; water, 1 gallon.

While the salt may be omitted, it is preferably included, and the solution thus made up is preferably applied hot, to the roof surface. After this solution has dried upon the roof surface, a fire resisting paint is applied. The preferred composition of such a paint is as follows:

Crude oil (14-24 pounds gravity) or cotton seed oil or fish oil, 1 gallon; linseed oil, ½ gallon; alum, 2 pounds; asbestine, 2 pounds; carbon tetrachloride, 1 quart; color pigment, 2 pounds.

This composition made up in any usual manner by mixing, is applied over the roofing material treated with the first named fire resisting composition.

It is further found to be desirable to treat the underside of the roofing material with a composition containing sodium silicate, asbestine, and water, preferably in the following proportions:

Sodium silicate, 1 gallon; asbestine, 18 pounds; water, 2 gallons.

In treating walls, either inside or outside walls, the following give a preferred method. The wall is first treated with a composition of sodium silicate and water, preferably in the following proportions:

Sodium silicate, 1 pint; water, 2 pints.

After this composition has been applied, and has dried, there is then applied a paint fire resisting composition containing linseed oil, alum, asbestine, carbon tetrachloride, and any desired paint paste. The proportions used are preferably:

Asbestine, 2 pounds; alum, 2 pounds; carbon tetrachloride, 1 quart; linseed oil, ½ gallon; paint paste, 5 pounds.

By "paint paste" is meant one having the consistency of a paste as distinguished from a pigment which is composed of solid particles.

The proportions set forth above in the several compositions will be found to give the best results, but they may be varied widely, although preferably not more than fifty per cent either way from the figures given above. The proportions of sodium silicate and water in the compositions containing these ingredients will in general vary according to the absorbent qualities of the material undergoing treatment therewith. It is also found to be advantageous to add sulphuric acid to the compositions, for example, from one-sixteenth to one-eigth of a pound added to one gallon of the paint fire resisting compositions increasing the fire resistant properties.

These compositions when applied serve to resist fire for a long time, and to prevent the spreading of flames. Fibrous substances so treated, when subjected to intense heat or fire of any character will only char at the point of contact with the heat or fire and will not burst into flames; and further such charring ceases upon removal of the heat or fire. That is, if the fire was placed on or against wood or any other fibrous substance treated with these compositions, it will only char where the fire comes into direct contact with the substances, and immediately go out when the fire is removed, making it impossible for fire to spread. This condition is created by the fact that when the heat is applied or strikes any such treated material, gases are generated which prevent access of the oxygen of the air to the treated material, so that combustion is prevented. The longer these solutions or paints have been on the treated material, the more effective they are in retarding fire. In treating the material with the several compositions set forth above, the latter may be either sprayed or painted on the surface, or both methods may be used. The roof painting compositions have a further noteworthy effect, namely, an expanding effect illustrated as follows. An old roof, on which the shingles were twisted and curled, was treated with roofing compositions as illustrated above. Shortly after the application of the paint, the shingles took their normal and regular shape and position as originally laid. In short these compositions applied to wood exert a softening and expanding effect and also act as preservatives.

Having thus set forth my invention, I claim:

1. A fire resisting composition containing the following ingredients in approximately the proportions stated: crude oil, 1 gallon; linseed oil, ½ gallon; alum, 2 pounds; asbestine, 2 pounds; carbon tetrachloride, 1 quart; and pigment, 2 pounds.

2. A fire resisting composition containing the following ingredients in approximately the proportions stated: linseed oil, ½ gallon; alum, 2 pounds; asbestine, 2 pounds; and carbon tetrachloride, 1 quart.

3. A fire resisting composition containing the following ingredients in approximately the proportions stated; linseed oil, ½ gallon; alum, 2 pounds; asbestine, 2 pounds; carbon tetrachloride, 1 quart, and paint paste, 5 pounds.

4. A fire resisting composition containing the following ingredients in approximately the proportions stated: linseed oil, ½ gallon; alum, 2 pounds; asbestine, 2 pounds; carbon tetrachloride, 1 quart; and from 1 to 2 ounces of sulphuric acid for each gallon of the composition.

JOSEPH RIGBY WATSON.